G. H. RUGG.
HARVESTING AND MOWING MACHINE.
No. 9,005. Patented June 8, 1852.
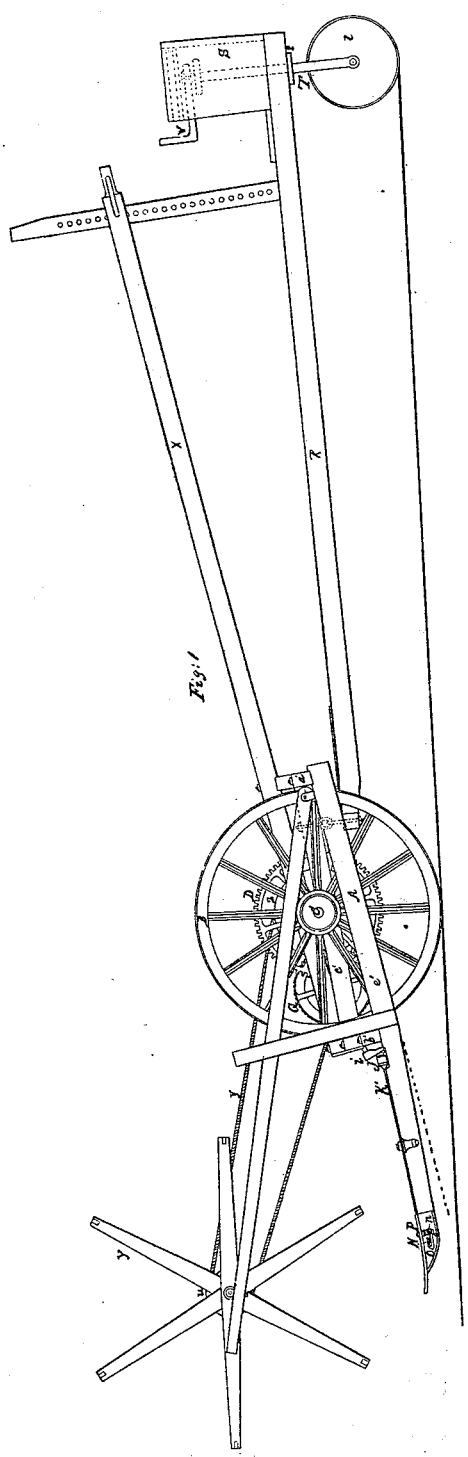
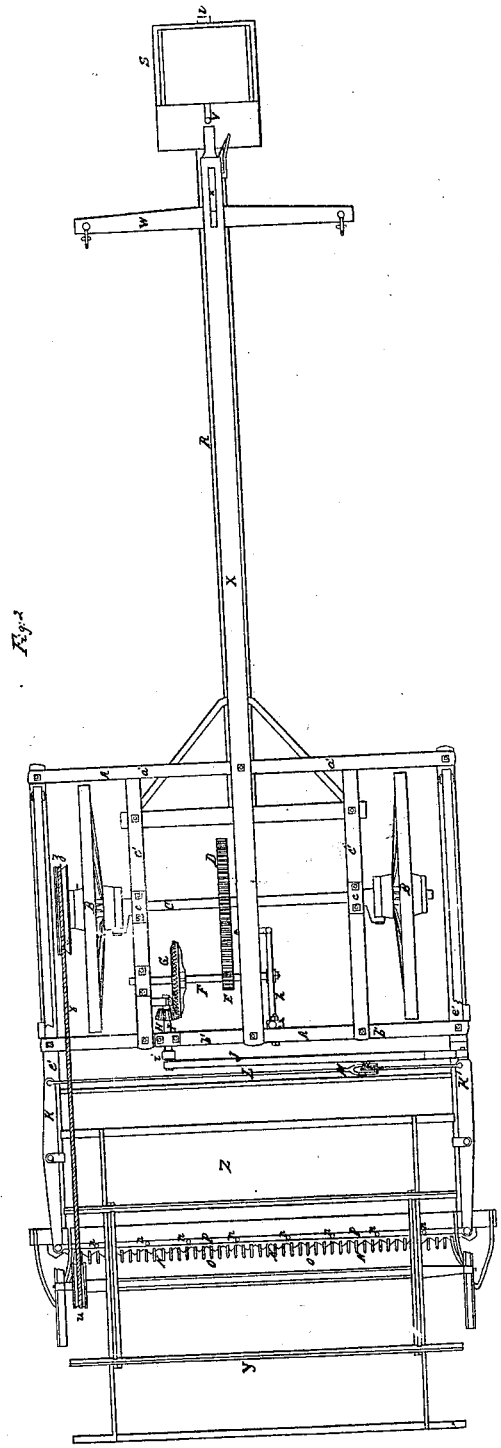

UNITED STATES PATENT OFFICE.

GEO. H. RUGG, OF SOUTH OTTAWA, ILLINOIS.

IMPROVEMENT IN HARVESTERS.

Specification forming part of Letters Patent No. 9,005, dated June 8, 1852.

*To all whom it may concern:*

Be it known that I, GEORGE H. RUGG, of South Ottawa, in the county of La Salle and State of Illinois, have invented a new and Improved Harvesting and Mowing Machine; and I do hereby declare that the following is a full, clear, and exact description of the same, reference being had to the annexed drawings, making part of this specification, in which—

Figure 1 is a side elevation. Fig. 2 is a plan or bird's-eye view.

Similar letters of reference indicate corresponding parts in each of the several figures.

The nature of my invention consists in the peculiar shape and arrangement of the fingers which set over the sickle, and by which the sickle, with the aid of the rivets which will be hereinafter described, is prevented from being clogged.

To enable others skilled in the art to make and use my invention, I will proceed to describe fully its construction and operation.

A A represent the frame. B B are the wheels, and C the axle, which fits in suitable bearings, $c\ c$, on the cross-pieces $c'\ c'$ of the frame. By referring to Fig. 1 the position of these cross-pieces will be seen. The back part of them are mortised in flush with the lower part of the back transverse cross-piece, $a'$, of the frame, and the front parts are bolted in the upper part of the transverse cross-piece $b'$. Now, it will be seen that the pieces $e'\ e'$ are bolted underneath the two transverse cross-pieces above mentioned—viz., $a'$ and $b'$—and consequently the side pieces are much lower than the longitudinal cross-pieces $c'\ c'$, on which the wheels B B are hung. This is a great advantage, as large wheels may be employed and the draft of the machine be much easier than when smaller wheels are used. The side pieces, $e'\ e'$, are somewhat curved. The dotted lines in Fig. 1 show the departure of the side pieces from a straight line and fully explain the curve. The object is to bring the sickle N to a proper position with respect to the ground, while the side pieces, on the front cross-piece of which is the sickle, being lower than the axle, grass or other material may be cut the required closeness.

D is a toothed wheel hung on the axle at about the center. This toothed wheel meshes into a pinion, E, which is hung on a vibrating shaft, F. On this shaft F is also hung a bevel-wheel, G, which meshes into a bevel-pinion, H. The bevel-wheel G is thrown in or out of gear with the bevel-pinion H by means of the lever $h$, acting upon the vibrating shaft F. This lever is of course moved by hand. The shaft I of the pinion H is of course placed longitudinally, and a crank, $i$, is attached to its outer end, to which one end of the connecting-rod J is attached.

L is the screw-rod which connects the lever K' with the lever K.

M is the screw by which the rod L is shortened. It is formed by cutting a screw, $m$, on one portion of the rod, which screws into a nut set between the prongs of a fork, $l$, on the other portion. (See Fig. 2.) The object in shortening the rod is to make the sickle perfectly taut, thus giving it greater facility to cut and preventing sudden jerks or jars.

N is the sickle, and O are the fingers. The sickle is attached by rivets $n$ to a metal strip, P, which is attached to the ends of the levers K' K. These rivets pass through the sickle and project a short distance below it. (See Fig. 1.) The fingers O are driven into the front cross-pieces of the frame, and have semicircular curves $o$. (Distinctly seen in Fig. 1.) These curves of the fingers are for the purpose of cleaning the rivets, forming a recess in which the rivets vibrate. By means of the curves and the rivets the sickle is prevented from being clogged, as the rivets draw out all straw or grass that may happen to catch between the sickle and fingers.

It will be seen that the sickle rests upon the lower part of the fingers, and the fingers are bent so as to project over a portion of the top of the sickle. (See Fig. 2.)

R is the reach. This is attached to the two cross-pieces of the frame and underneath them, so that the reach may be attached at a point lower than the axle of the wheels. By this means the propelling-power has a tendency to raise the sickle from the ground, instead of forcing it down.

S is a box on the end of the reach, on the top of which is placed the driver's seat.

T is the rod which passes up vertically through the end of the reach. The reach rests upon a shoulder, $v$, on the rod, as seen in Fig. 1. The roller U is attached to the lower part of the rod, and the roller is turned either right or left by the knees of the driver acting upon the lever V on the top of the rod T, said lever projecting out a short distance in front of the seat and directly underneath it. To the reach R may be affixed the usual splinter-bar, to which the horses are attached. It will thus be seen that the working parts of the machine are in front of the motive power, and the draft in this case is much easier than when the motive power is on one side, the propelling-power being more direct.

X is a lever attached to the frame A A—at one end to an upright, $x$, attached to the reach through a mortise near the other end. This lever is for the purpose of raising and depressing the front of the machine, and consequently the sickle. By this means grain may be cut so that the straw may be of any length required, and grass may be cut as close as the nature of the ground will admit. This lever X may be secured by a pin passing through holes in the upright $x$. (See Fig. 1.)

Y is the conveyer-reel, driven by the pulley $z$, hung on the axle $c$. $y\,y$ is the rope which passes over the pulley $z$ and pulley $u$ on the axle of the reel. When the grain is to be cut a platform, Z, is placed on the front of the frame, as seen in Fig. 2, on which the grain passes after being cut, and is raked off; but when grass is to be mowed the platform is removed, and the grass passes over the sickle and front cross-piece of the frame and falls upon the ground.

I do not confine myself to any particular material in the construction of my machine. The frame will probably be of wood and the working parts constructed of metal.

Having thus described the nature and operation of my invention, what I claim as new, and desire to secure by Letters Patent, is—

The curved fingers O, in combination with the rivets $n$, projecting below the sickle N, by which means the sickle is prevented from being clogged or bound, substantially as described.

G. H. RUGG.

Witnesses:
   JAMES STOUT,
   I. H. McGREGOR.